United States Patent
Arendell et al.

(10) Patent No.: US 11,699,833 B2
(45) Date of Patent: Jul. 11, 2023

(54) METHOD AND APPARATUS FOR OPTIMIZING BATTERY CELL UTILIZATION IN A PORTABLE COMMUNICATION DEVICE

(71) Applicant: MOTOROLA SOLUTIONS, INC., Chicago, IL (US)

(72) Inventors: Scott J Arendell, Buford, GA (US); William B. Kiger, Flowery Branch, GA (US); Frederick J Weissinger, Duluth, GA (US); Mark Chua Taraboulos, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 383 days.

(21) Appl. No.: 16/908,773

(22) Filed: Jun. 23, 2020

(65) Prior Publication Data

US 2021/0399272 A1  Dec. 23, 2021

(51) Int. Cl.
  H02J 7/00    (2006.01)
  H01M 50/572  (2021.01)
  G06F 1/3296  (2019.01)
  H01M 10/48   (2006.01)
  H01M 10/42   (2006.01)
  G06F 1/3212  (2019.01)

(52) U.S. Cl.
  CPC ........ *H01M 50/572* (2021.01); *G06F 1/3212* (2013.01); *G06F 1/3296* (2013.01); *H01M 10/4257* (2013.01); *H01M 10/48* (2013.01); *H02J 7/0044* (2013.01); *H02J 7/007182* (2020.01)

(58) Field of Classification Search
  None
  See application file for complete search history.

(56) References Cited

U.S. PATENT DOCUMENTS

| | | | |
|---|---|---|---|
| 5,945,806 A | 8/1999 | Faulk | |
| 6,018,229 A | 1/2000 | Mitchell et al. | |
| 9,524,018 B2 | 12/2016 | Sultenfuss et al. | |
| 2015/0035370 A1* | 2/2015 | Wyatt | H01M 10/425 307/77 |
| 2017/0062876 A1* | 3/2017 | Narla | H02H 3/087 |

* cited by examiner

*Primary Examiner* — Arun C Williams
(74) *Attorney, Agent, or Firm* — Barbara R. Doutre

(57) ABSTRACT

A battery pack is provided that can better manage peak current of in a converged portable radio. The battery pack comprises an internal Li-Ion cell stack characterized by a linear output voltage curve. A DC-DC converter converts the internal cell stack voltage to a desired DC-DC converter output voltage. The output voltage and current sourcing capability of the battery pack remain constant over the full cell discharge curve. The battery pack optimizes cell utilization, without the use of any internal microprocessor, thereby supporting the operation of simultaneous high peak current application features associated with LMR and LTE.

26 Claims, 6 Drawing Sheets

METHOD AND APPARATUS FOR OPTIMIZING BATTERY CELL UTILIZATION IN A PORTABLE COMMUNICATION DEVICE

FIELD OF THE INVENTION

This application pertains to battery packs for battery powered portable communication devices and more particularly to optimizing battery cell utilization to accommodate peak current demands from increased device features of a portable communication device.

BACKGROUND OF THE INVENTION

Portable battery powered radio communication devices are often utilized in public safety environments, such as law enforcement, fire rescue, and the like, to provide mission critical communications operating over a public safety platform, such as, for example, a land mobile radio (LMR) platform. Portable LMR radios are constant power devices where the current demand increases as the voltage decreases. Such devices, usually operating under low current conditions (standby), can be powered by legacy Li-ion cells capable of handling LMR peak currents. However, there is an increased desire to incorporate additional features into the portable radio device, where such features run on non-LMR platforms, such as LTE and WiFi to name a few. Such devices may be referred to as converged devices, and the additional features, when enabled, increase the current peaks of the device thereby increasing current demand on the battery. An approach to addressing the current peaks in a converged device is to throttle or turn off features, which unfortunately can limit user access to certain features even when the battery has sufficient energy to handle the feature.

Hence, improved power management approaches are needed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
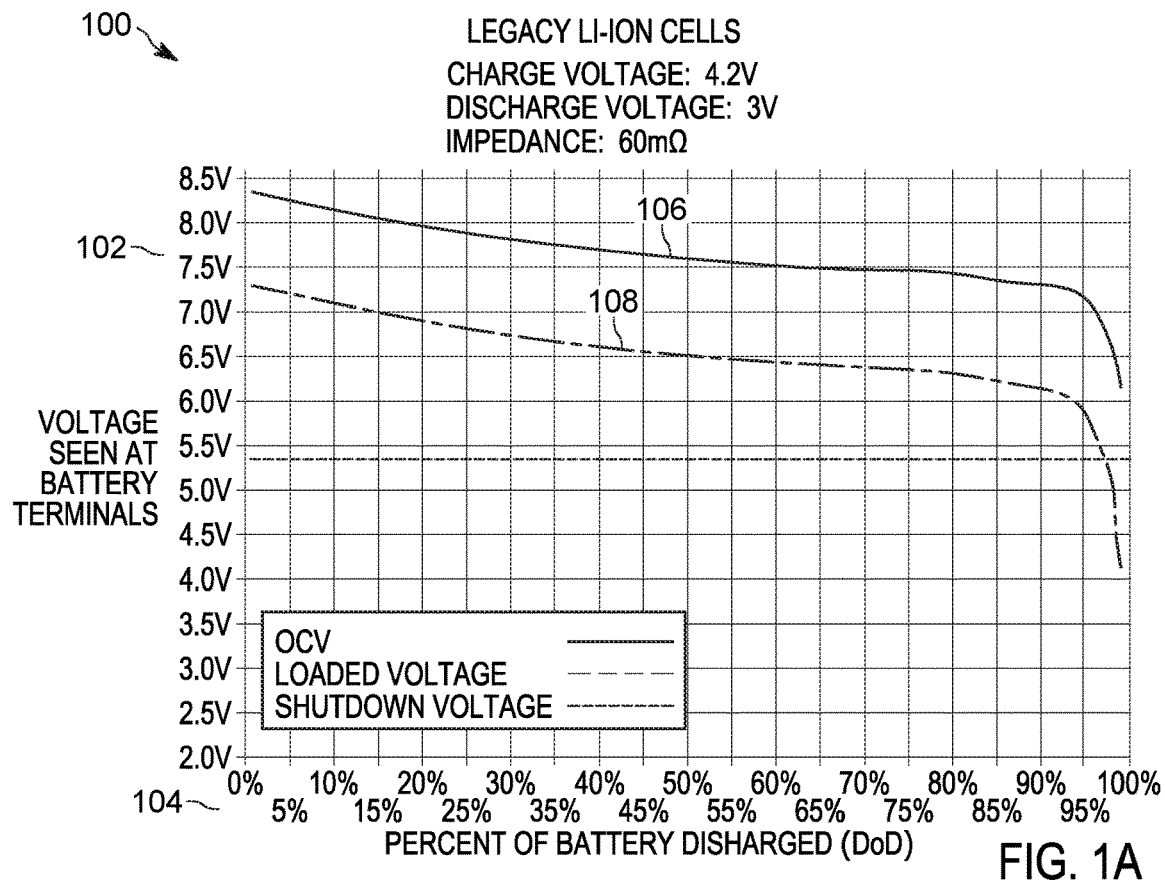
FIGS. 1A and 1B are graphs comparing lithium ion cell technology trends.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a battery pack and method and apparatus for optimizing battery cell utilization for a converged portable communication device. The battery pack supports current peaks of a converged device incorporating LMR P25 and broadband communications without throttling or turning off features.

Figure 1B:
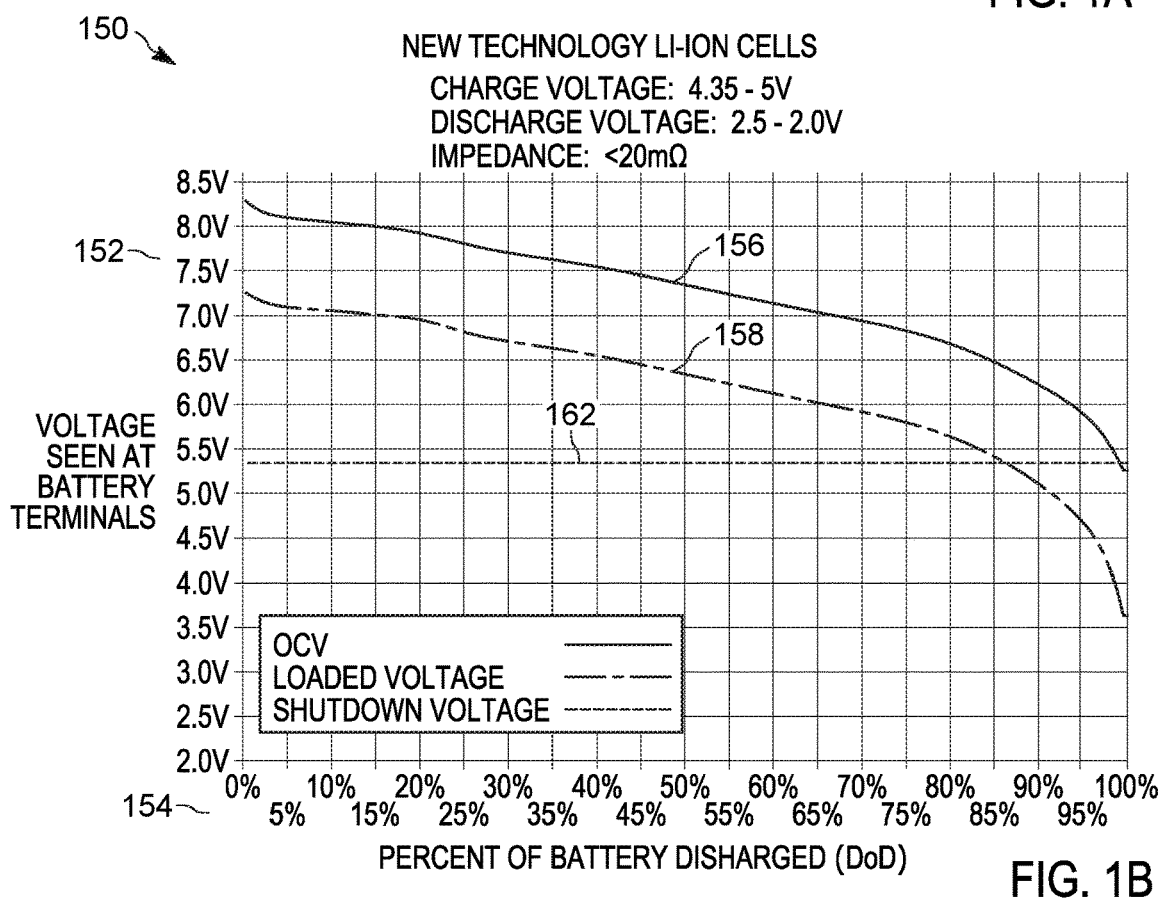

FIGS. 1A and 1B compare example discharge curves of legacy Li-ion cells to newer technology Li-ion cells, arranged in a two series (2S) configuration. Graph 100 shows an example of two discharge curves for legacy lithium ion cells with voltage on vertical axis 102 and percent of battery discharge on horizontal axis 104. Curve 106 represents a cell discharge curve under radio standby loading conditions, and curve 108 shows the battery discharge curve under full radio loading conditions. The legacy technology Li-ion cells have a substantially flat (non-linear) discharge curve with steep drop off. While a battery pack formed of legacy Li-ion cells can adequately support the peak current demands of an LMR radio (for example 2 Amps-3 Amps), the legacy Li-ion cells are not adequate to support current peaks on a converged device incorporating LMR P25 and broadband communications unless undesirable throttling of feature and feature turn off is used. This inability to support peak currents is due mainly to the current discharge limitations from cell manufacturers, and the relatively high impedance of the cells (60 mOhm), which causes a larger voltage difference between standby and full radio loading conditions.

Graph 150 shows an example of a discharge curve for newer technology lithium ion battery cells with voltage on the vertical axis 152 and percent of battery discharge on the horizontal axis 154. The newer technology li-ion cell is a higher energy density cell designed for higher charge voltages (e.g. 4.35-5 V), lower discharge voltages (e.g. 2.5V-2.0), lower impedance (e.g. 20 milliohms), higher discharge current, and a more linear discharge curve. Curve 156 represents a cell discharge curve under standby loading conditions, and curve 158 shows the battery cell discharge curve under full radio loading conditions. While the newer technology cells are advantageous in handling higher peak currents, such as the current in a converged radio device (e.g. 4.5 A-6 A), there are challenges associated with the slopped down discharge curves, particularly as the voltage sag approaches the shutdown voltage level 162 (e.g. shutdown level of 5.3 volts), where higher inefficiencies are observed. This results in a loss of capacity for the battery/device as the device cutoff voltage is higher than the full cell capacity discharge voltage.

Additionally, the ability to use the newer lithium-ion technology batteries in HAZLOC (spark avoidance) radio applications is particularly challenging due to the impedance that is added to the battery to meet the HAZLOC requirements. This additional resistance results in a higher voltage drop under full load and is further exacerbated under cold temperature conditions. The discharge trends of these newer Li-ion cells have an even further negative impact on overall radio performance. These newer Li-ion cells are also difficult to implement in portable HAZLOC radio products due to the increased voltage range (4.35V+ versus legacy 4.2V, or 8.7V+ versus 8.4V in a 2S system) which adversely affects spark performance and limits system capacitance. While useable capacity is available in the battery, the voltage drop, particularly during peak currents and during cold temperature environments, prohibits the radio from accessing the available energy.

In accordance with various embodiments, a battery pack is provided herein for a portable communication device, the battery pack comprising a plurality of Li-ion cells providing a voltage headroom above a predetermined level of the device operating voltage, the voltage headroom compensating for voltage sag in normal cell discharge. In accordance with the embodiments the battery pack further comprises a DC-DC converter being applied to the plurality of cells in order to maintain the battery pack output at a predetermined constant operating voltage level that is below the total cell voltage of the plurality of cells. The voltage headroom and the predetermined constant operating voltage provide constant operational power regardless of cell discharge characteristics and under all output current conditions.

Figure 2:
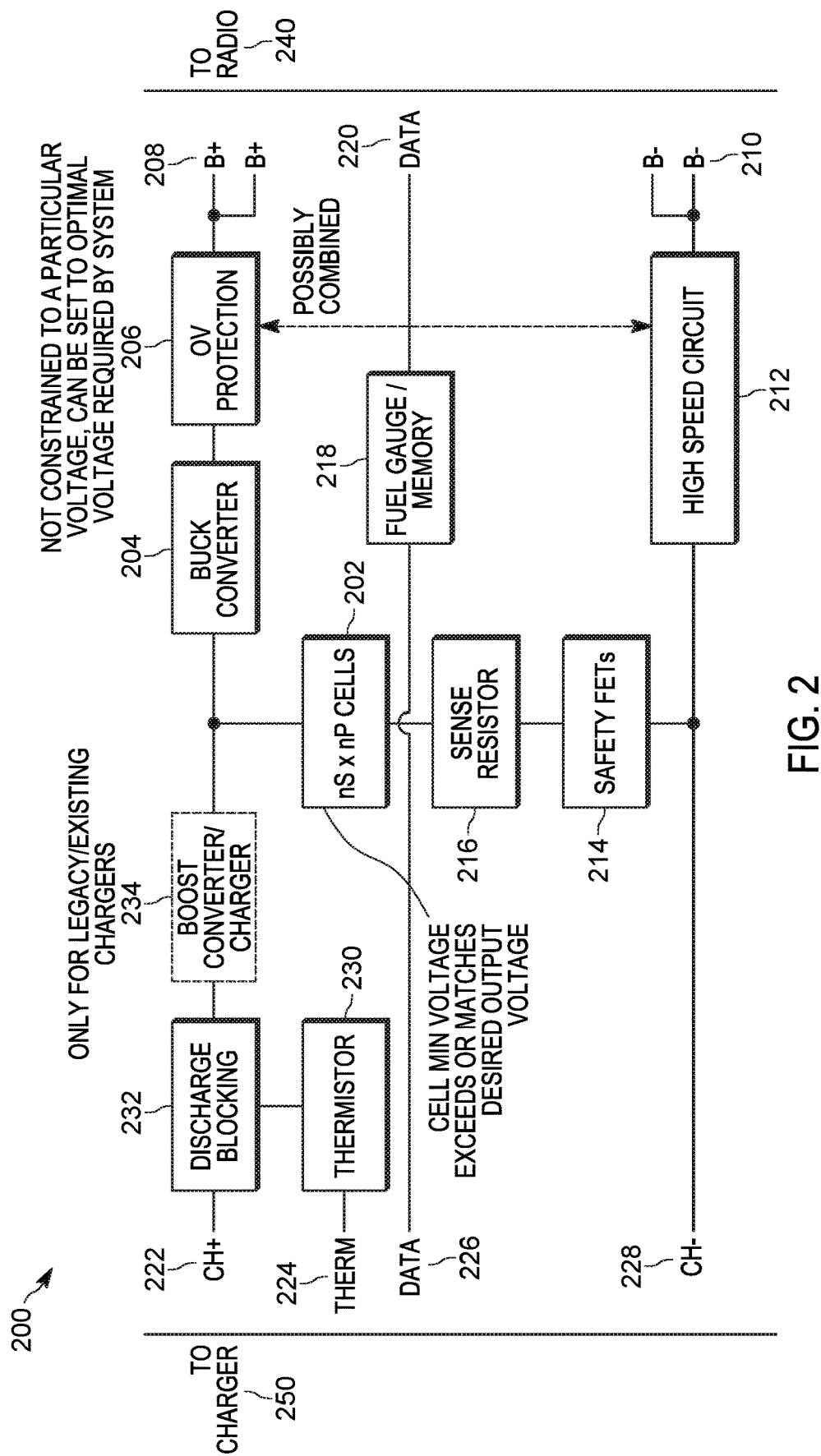
FIG. 2 is block diagram of a battery pack for a portable communication device in accordance with some embodiments.

FIG. 2 is block diagram of a battery pack 200 for a portable communication device in accordance with some embodiments. The portable communication device is shown as a radio portion 240, the radio portion providing converged communications over LMR P25 and broadband. Battery pack 200 comprises a plurality of Li-Ion cells 202 coupled in a series and parallel (nS×nP) configuration. The plurality of Li-Ion cells 202 provide a battery supply voltage to an input of a DC-DC converter 204. In this embodiment, the DC-DC converter 204 comprises a buck converter which takes the battery supply voltage (e.g. 10.8V nominal voltage) and reduces it to a constant controlled voltage output (e.g. 7.5V). Other DC-DC converter options are also possible as will be discussed in alternative embodiments.

In accordance with the embodiments, the constant controlled voltage output of the DC-DC converter 204 is presented to an overvoltage protection circuit 206. The overvoltage protection circuit 206 has an overvoltage protection threshold that trips at high voltage levels indicative of faults in the buck converter. The overvoltage protection circuit may be formed of a zener diode clamp, a voltage comparator, or other known overvoltage detection approaches. The overvoltage protection circuit prohibits exceedingly high voltages from going from the battery pack 200 to a portable radio. Different thresholds of faults can be detected by the overvoltage protection circuit, for example DC-DC converter faults at full cell voltage and spark induced faults (HAZLOC) are a few examples of overvoltage protection faults.

Current travels from DC-DC converter 204 to the overvoltage protection circuit 206 and to positive supply contact 208 (B+) of battery pack 200. Current continues to travel through the radio load and back to the battery pack 200 via negative supply contact 210 (B−) of battery pack 200.

In some embodiments, the battery pack 200 may further comprise a high speed current detect circuit 212 for HAZLOC radio applications. The high speed current detect circuit 212 monitors current into the negative supply contact 210 (B−) (or could be positive supply contact) and trips at high speed in response to high currents thereby preventing the high currents from going back into the battery pack 200 as well as the radio load. For non-HAZLOC radio applications the high speed current detect circuit 212 is not required.

The battery pack 200 further comprises a plurality of safety field effect transistors (FETs) 214 and a sense resistor 216 combined to provide overvoltage, undervoltage and short circuit protection during normal radio operations. Sense resistor 216 performs current monitoring and setting of the safety FETs 214 for short circuit protection. Current returning back through the negative supply contact 210 (B−) travels to safety FETs 214 and through sense resistor 216 (or other current monitoring components) before returning back to a negative potential side of the plurality of cells 202.

The battery pack 200 further comprises a fuel gauge and memory 218 that provide battery status to the radio device via a data contact 220 of the battery pack. State of charge, authentication, handshake, identification, gas rating (e.g. DIV 1), and kit number are just a few examples of battery parameters which can be shared with the portable radio as well with a charger, shown as charger portion 250. The battery pack 200 includes a positive charging contact (CH+) 222, a thermistor contact 224, a charger data contact 226, and a negative charger contact (CH−) 228. When the battery pack 200 is coupled to the charger, charger determines charge voltage and charge current via the charger contacts.

The thermistor contact 224 of battery pack 200 is coupled to an internal thermistor 230 which is read by the charger to maintain battery temperature during charging. In accordance with the embodiments, the battery pack 200 further comprises a discharge blocking circuit 232 coupled to the positive charging contact 222. When the battery pack 200 is being charged, the discharge blocking circuit 232 is turned on in order to drive a charging signal directly into the plurality of cells 202.

In accordance with some embodiments, the battery pack 200 may further comprise another DC-DC converter 234 coupled to the blocking circuit 232 for boosting a lower input voltage generated by the charger to a higher voltage for charging the cells 202. In charging mode, the sense resistor 216 and safety FETs 214 are used to determine charger current and overvoltage levels while the battery pack 200 is in the charger.

The additional boost converter 234 is only needed in applications where a higher number of cells in series (higher voltage) in a battery pack are used with a charger that has a limited output voltage that is not high enough to charge this higher voltage battery. Battery packs that are charged with chargers that provide a higher voltage output may not require this boost converter in the battery. Hence, incorporating the boost converter 234 into the battery pack 200 provides the advantageous capability of utilizing lower output voltage chargers while still providing a battery pack that operates using the higher voltage cell technology and cell configuration.

The DC-DC converter 204 implemented as a buck converter 204 takes a voltage supply input from the cells and drops down the voltage to a reduced controlled voltage. The radio load is looking for a constant power input. Past traditional Li-ion batteries have a wider voltage range (8.4V to 6V) and thus the radio load has to be adjusted to meet the constant power demand. This results in lower current being drawn from the battery at high voltages (8.4V) and higher currents drawn at lower voltages (6V). This can result in premature radio turn offs or a large design margin for low voltage cutoff which ultimately results in lower radio talk time because the full battery capacity cannot be realized. Using the Li-ion cell bank 202 that provides a higher cell voltage to drive a DC-DC converter allows for a constant power output to the radio device. The output voltage and current sourcing capability can be advantageously constant over the full cell discharge curve. The battery pack 200 is implemented without any internal microprocessor, thereby providing the benefits of reduced cost and complexity. All microprocessor controls are within radio portion 240 as well and charger portion 250.

Advantages are experienced at the radio device side as well. Past Li-ion cell packs required that the portable radio step down the wider voltage ranges using a constant voltage output regulator. The battery pack 200 maintains a constant output voltage and constant current sourcing capability via the DC-DC converter, regardless of changing impedance of the plurality of battery cells. Using the DC-DC buck converter 204 in the battery pack 200 eliminates the need for a regulator in the radio, thereby improving system efficiency. Moving the voltage regulation, as provided by the embodiments, to the battery pack 200 provides a more controlled output and a more efficient system design.

From a HAZLOC standpoint, the battery pack 200 provides lower operating voltages than those of a traditional 2S pack, thereby maximizing current source capability before a spark. In other words, the voltage output to the device has been decreased which provides the opportunity to increase the current available from the battery which is greatly advantageous under peak current load conditions. Peak current demands, which are higher than could previously be delivered, are now handled by lowering the voltage thereby providing more current capability. Taking an example comparison of a past legacy approach to the new approach, a past 2S legacy battery pack providing 8.4V at 5 amps (42 watts of power) would be stepped down within the radio to deliver 7.5 volts to the radio circuits, whereas a new 3S battery pack provides for the same power of 42 Watts, by reducing the voltage to 7.5V (within the battery pack) and increases the current to 5.6 amps of sourcing capability. While the voltage to the radio load looks the same, the increased current sourcing capability is better able to handle peak currents, such as the peak currents of a converged device. A battery powered converged portable radio which can provide LMR P25 and broadband application features can now further advantageously simultaneously operate high current peak features associated with LMR and broadband applications, thereby negating the need to throttle or turn off features. Such features may be for example, GPS, WiFi, data processing speed, and any other applications (apps) associated with the portable device. In the past, LMR application features were given priority due to the mission critical nature of LMR. Now however, high peak current application features associated with LTE can advantageously be run simultaneously with the LMR application features.

Figure 3:
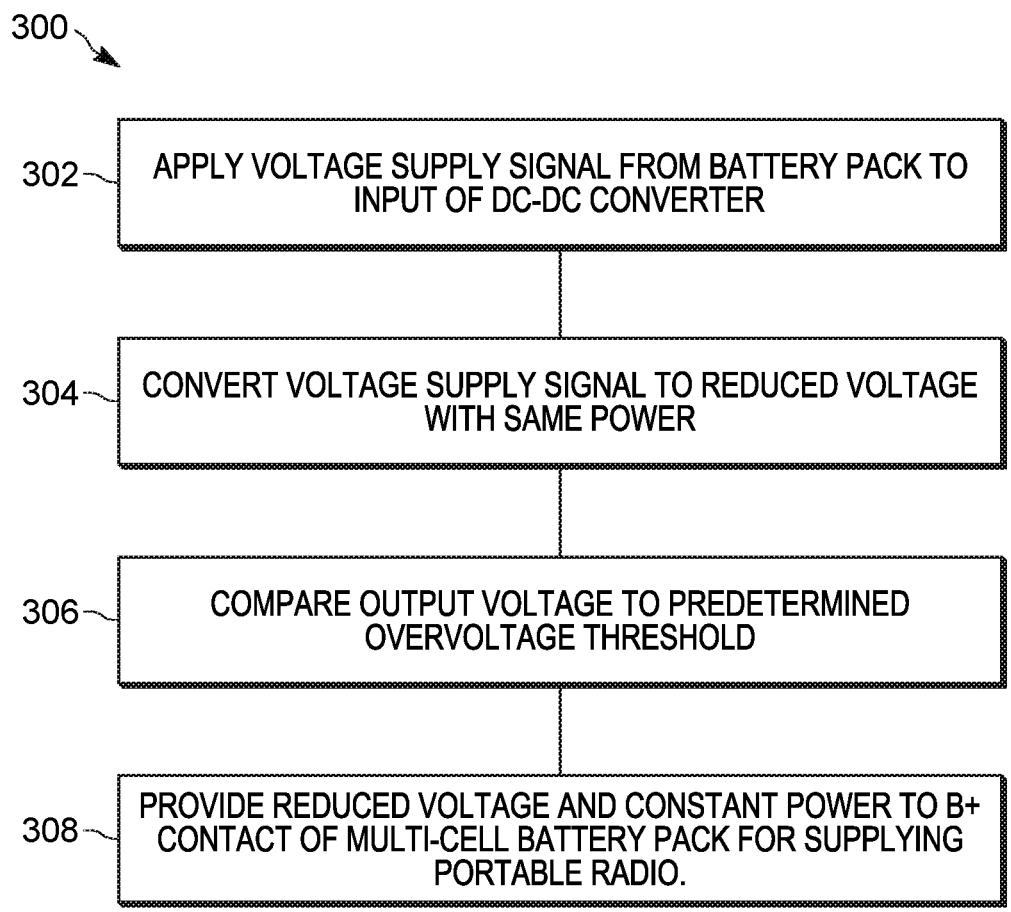
FIG. 3 is a flowchart of a method for managing power in a battery pack in accordance with various embodiments.

FIG. 3 is a flowchart of a method 300 for managing power in a battery pack in accordance with various embodiments. The method 300 begins by applying at 302 a voltage supply signal from a Li-ion multi-cell battery pack to an input of a DC-DC converter. The Li-ion battery pack is characterized by a linear output voltage curve with an internal cell stack output voltage that is higher than the desired DC-DC converter output voltage thereby providing headroom for the DC-DC converter to operate properly to provide the desired constant device supply voltage. At 304, the method proceeds by converting the applied voltage level to a reduced voltage with same power output at an output of the DC-DC converter. The method continues at 306 by comparing, using an overvoltage protection circuit, the reduced voltage to a predetermined overvoltage threshold. The overvoltage threshold is set to a threshold level that prevents excessive voltage being presented to the battery contact of the device. The reduced voltage and contact power are provided to a supply contact (B+) of the multi-cell battery pack for supplying voltage and sourcing current to the portable radio. The method may further comprise boosting a lower input voltage generated by a charger to a higher voltage for charging the cells during a charging mode.

Figure 4:
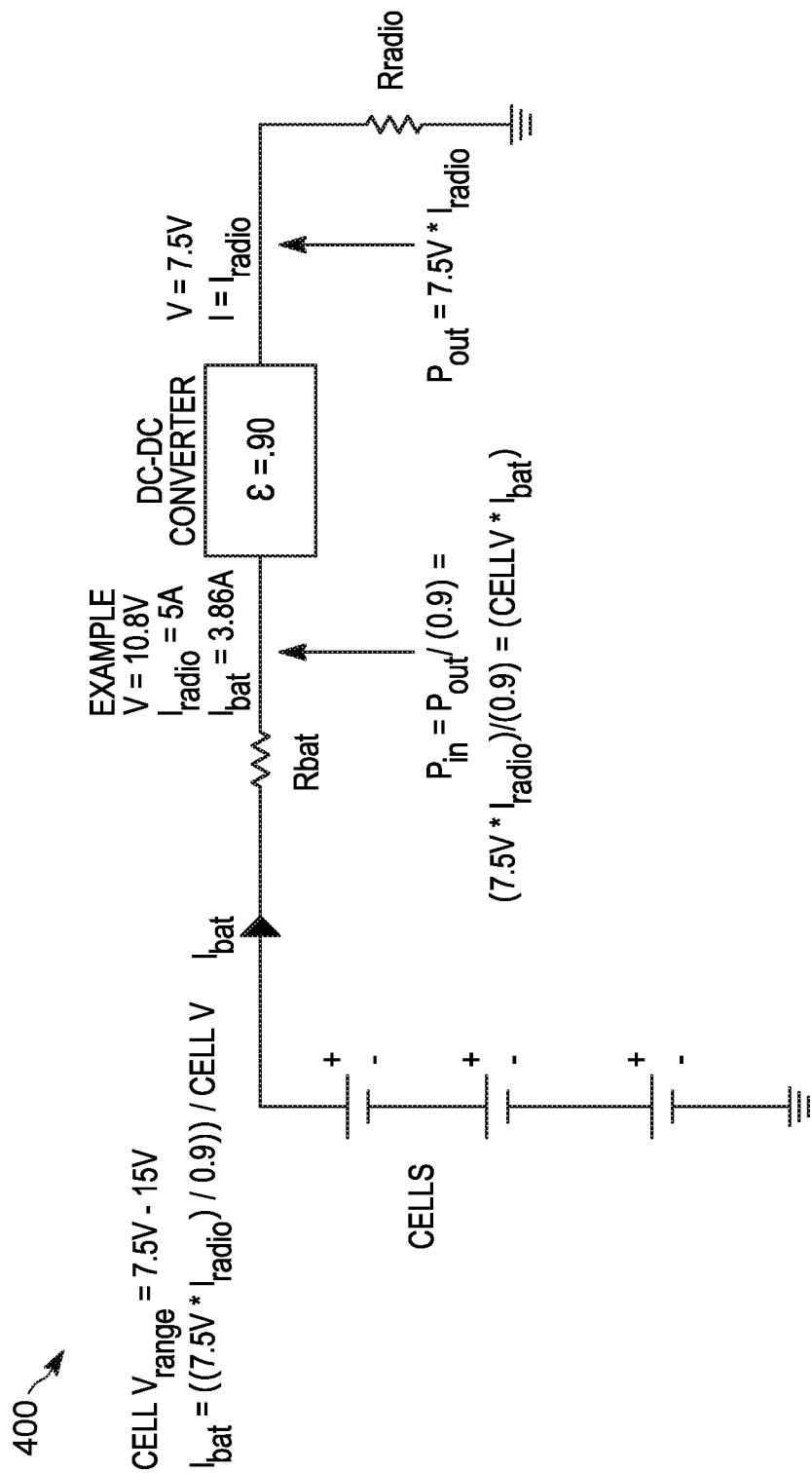
FIG. 4 is simplified schematic representation of the operation of the battery pack formed in accordance with some embodiments.

FIG. 4 is simplified schematic representation 400 of the operation of the battery pack of FIG. 2 formed in accordance with some embodiments. The Li-ion cells are shown coupled in series, (3 S configuration) with a voltage range of 7.5V-15V providing a battery voltage for the battery pack. As with any DC-DC buck converter, the power presented to the load/device (Pout) is equal to the power into the converter (Pin) multiplied by the efficiency of the converter, i.e. Pout=Pin*0.9 with a ninety percent efficient converter. With this relationship, the input current to the converter is calculated in a known manner based on the cell voltage, voltage output of the converter, and current demand of the radio/device on the output of the converter. For example, if the cell voltage is 10.8V, the output voltage of the converter is 7.5V, and the current demand is 5 A, then the current the cells need to source is lowered to 3.86 A. This configuration as described herein provides the ability to deliver a higher current to the device/radio at a lower voltage while reducing the current demand of the higher cell voltage stack, thus reducing any detrimental effects of the voltage loss across the internal cell and battery impedance (Rbatt).

Figure 5A:
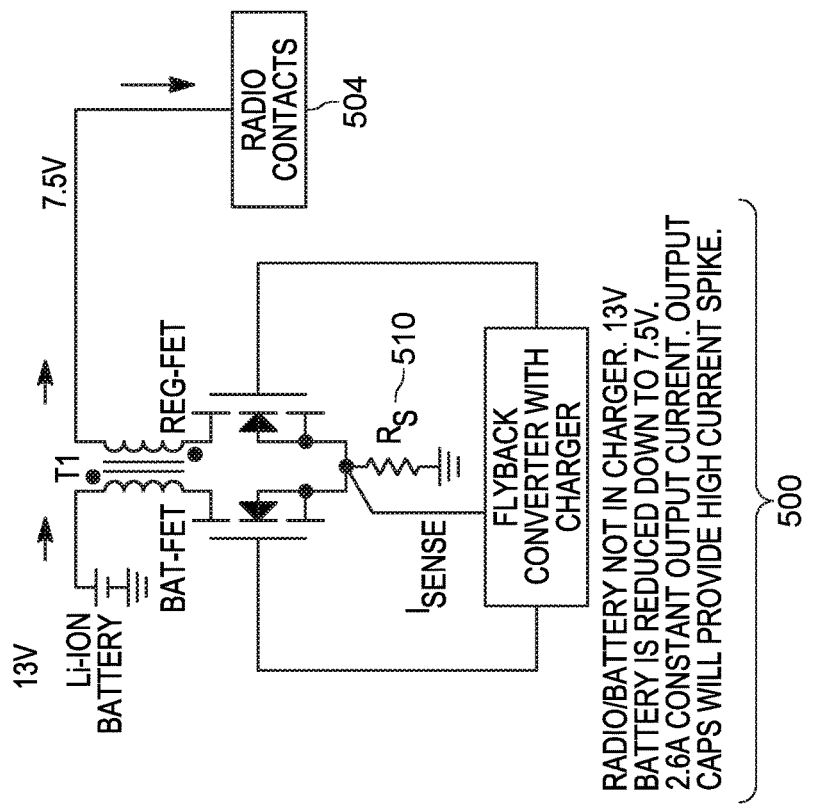
FIGS. 5A and 5B show block diagrams of an alternative DC-DC converter for the converter of FIG. 2 in accordance with an alternative embodiment.
Figure 5B:
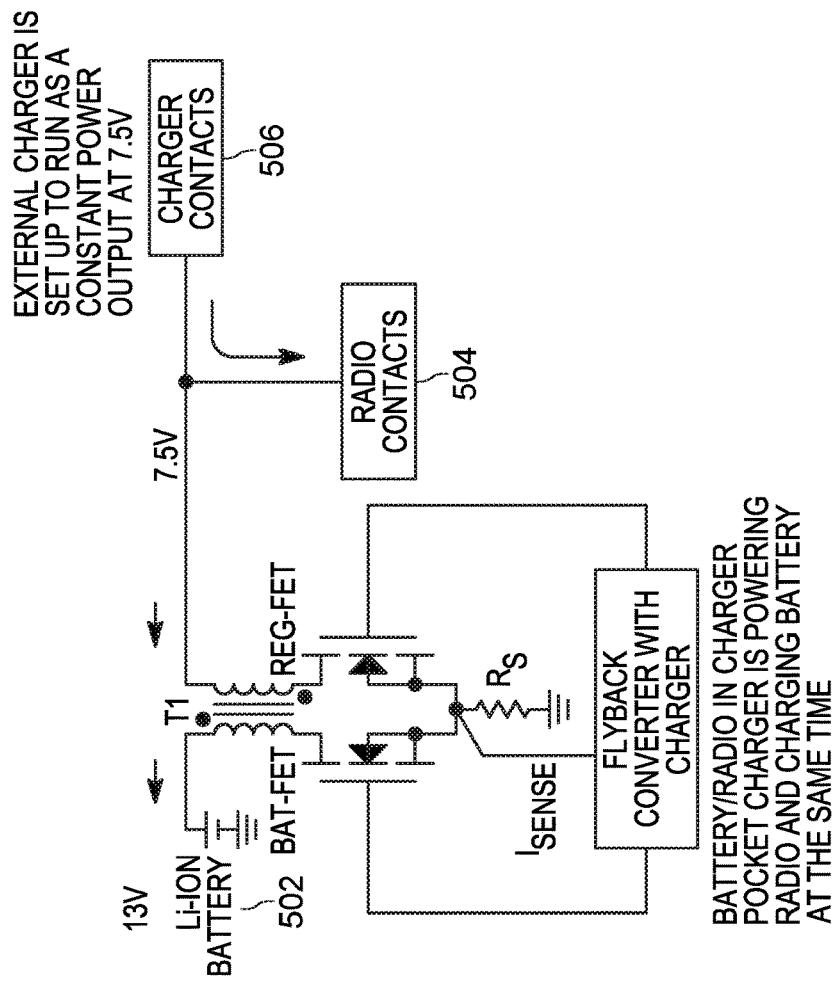

FIGS. 5A and 5B show block diagrams of an alternative converter for the converter of FIG. 2 in accordance with an alternative embodiment. In this embodiment, the buck converter 204 and booster converter 234 configuration of FIG. 2 is replaced with a flyback converter with charger. Such integrated devices are available in the market. Other applicable components of FIG. 2 are not shown in this view for ease of discussion. Use of the flyback converter with charger, allows discrete components for both the flyback DC-DC converter and battery charger to be shared. The flyback converter is operatively coupled between Li-ion cells 502 (e.g. 13V) and radio contacts 504 of the battery. The flyback converter allows the cell stack in this embodiment to be a 3S cell stack, where the flyback operation will lower the voltage to the desired device voltage, and the flyback converter will raise the voltage from the external charger (not shown) for charging the internal cell stack. When the battery pack is coupled to a portable radio and seated in a charger, the charging contacts 506 of the battery pack (CH+, CH−, DATA of FIG. 2) are electrically coupled to the radio contacts 504 of the battery pack (B+, B−, DATA), as shown in FIG. 5A. The external charger (not shown) provides a constant voltage output (e.g. 7.5V) to the charger contacts 506 of the battery pack thereby powering the radio and charging the battery simultaneously.

When the battery powered radio is not in the charger, as seen in FIG. 5B, the battery voltage (13V) is converted by the flyback converter to 7.5 V with a constant output current (2.6 A) sensed through current sense resistor 510. Hence a constant power of 19.5 W has also been provided. The flyback converter 500 being applied to the plurality of cells 502 manages the battery cell output (13V) to a predetermined constant operating voltage level (7.5V) that is below the total cell voltage of the plurality of cells (13V). The voltage headroom and the predetermined constant operating voltage (7.5V) provide constant operational power regardless of cell discharge characteristics and under all output current conditions.

Figure 6:
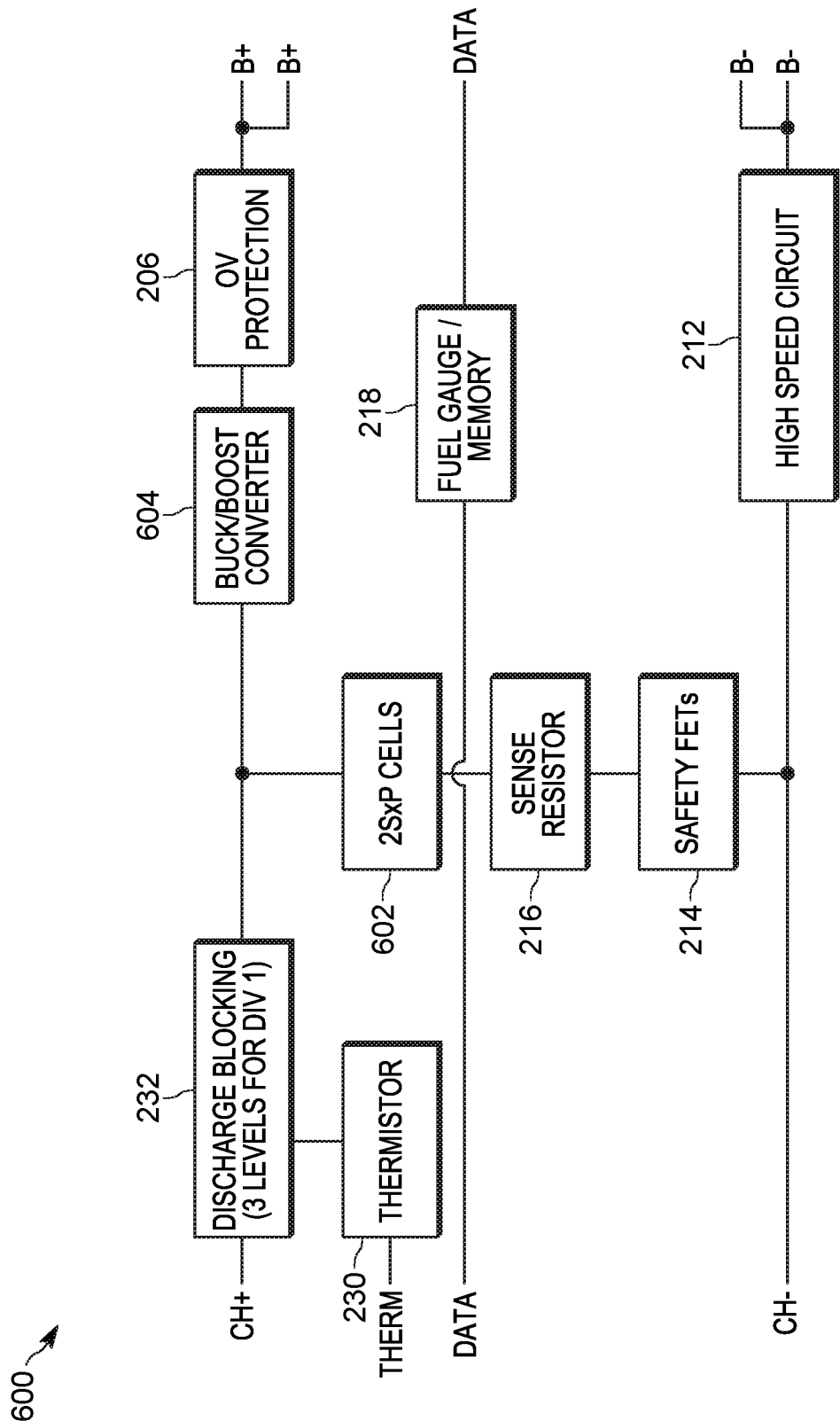
FIG. 6 is block diagram of a battery pack for a portable communication device in accordance with an alternative embodiment.

FIG. 6 shows a block diagram of an alternative converter for the converter of FIG. 2 in accordance with an alternative embodiment. In this embodiment, the buck converter configuration of FIG. 2 is replaced with a buck/boost converter. The purpose of this buck/boost is to provide a constant output voltage to the device regardless of the cell stack voltage ranges. In this example a 2S (2 cells in series) cell stack 602 with a voltage range of 6V to 8.4V can be applied to the buck/boost converter 604 and the converter will output a constant 7.5V to the device. Other applicable blocks from FIG. 2 are carried over but not described (e.g. overvoltage protection 206, high speed circuit 212, safety FETS 214, sense resistor 216, discharge blocking 232, and thermistor 230). When a voltage headroom of additional cells is not achievable, the buck/boost converter 604 can take a lower than desired cell stack voltage and increase it to the desired 7.5V output (boost mode). Conversely, if the cell stack voltage is higher than the desired output, the converter can decrease the voltage to the desired 7.5V output (buck mode). Hence, the battery pack 600 may comprise a plurality of cells that present a voltage range that extends below and above the desired output voltage and a DC-DC converter that comprises a buck/boost converter for increasing and decreasing cell voltage to provide a desired output voltage. Hence, in cases where mechanical requirements are such that only 2S cell packs can be used, for example in cases were where adding a cell may be size prohibitive, the 2S battery pack can now be configured using the buck/boost converter without changing the size of the battery pack (the converter is small) and without changing charger configurations. The buck converter of FIG. 2 provides better efficiency than the buck/boost converter of FIG. 6, tradeoffs can be balanced for mechanical size and charger interface limitations.

Accordingly, embodiments have been provided that provide for a battery pack that can better manage peak current of a converged portable radio device that provides communications over P25 and broadband operations. High current features whether LMR features, LTE features or simultaneous LMR and LTE features can all be managed without throttling or turning off features.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery pack for a portable radio, the battery pack comprising:
    a plurality of Li-Ion cells providing a voltage headroom above a predetermined level of a normal operating voltage of the battery pack, the voltage headroom compensating for voltage sag in normal cell discharge; and
    a DC-DC converter being applied to the plurality of Li-Ion cells to manage a battery pack output voltage to a constant operating voltage that is below a total cell voltage of the plurality of cells, the voltage headroom and the constant operating voltage providing constant operational power regardless of cell discharge characteristics and under all output current conditions of the portable radio.

2. The battery pack of claim 1, wherein at least one cell in the plurality of cells provides the headroom.

3. The battery pack of claim 1, wherein the battery pack operates without an internal microprocessor.

4. The battery pack of claim 1, wherein the plurality of Li-Ion cells are in series and/or parallel providing an internal nominal battery pack voltage that is greater than the battery pack output voltage.

5. The battery pack of claim 1, wherein battery pack further comprises:
    an overvoltage protection circuit set to trip in response to faults of the DC-DC converter.

6. The battery pack of claim 1, wherein the battery pack further comprises:
    a charging contact; and
    a discharge blocking circuit coupled to the charging contact to prevent high voltage from being presented at the charging contact when the battery pack is not in a charger.

7. The battery pack of claim 1, wherein the DC-DC converter of the battery pack comprises a buck converter.

8. The battery pack of claim 1, wherein the DC-DC converter of the battery pack comprises a flyback converter.

9. The battery pack of claim 1, wherein the DC-DC converter of the battery pack comprises a buck converter and a boost converter.

10. The battery pack of claim 1, wherein the battery pack comprises:
    a plurality of cells that present a voltage range that extends below and above a desired output voltage; and
    a DC-DC converter that comprises a buck/boost converter for increasing and decreasing cell voltage to provide the desired output voltage.

11. The battery pack of claim 1, wherein the battery pack maintains a constant output voltage and constant current sourcing capability via the DC-DC converter, regardless of changing impedance of the plurality of Li-Ion cells.

12. The battery pack of claim 1, further comprising:
    a high speed current detect circuit for spark avoidance HAZLOC radio applications.

13. The battery pack of claim 1, further comprising:
    a high speed current detect circuit that monitors current of the battery pack and trips at high speed in response to high currents, thereby preventing the high currents from going back into the battery pack as well as into the radio load.

14. A method for managing power in a battery pack for a portable radio device, the method comprising:
    within the battery pack:
    applying a voltage supply signal from a Li-ion multi-cell battery pack to an input of a DC-DC converter, the voltage supply signal being supplied from a headroom voltage, the headroom voltage being above a predetermined level of a normal operating voltage of the battery pack;
    converting the applied voltage supply signal to a reduced voltage with same power output at an output of the DC-DC converter;
    comparing, using an overvoltage protection circuit, the reduced voltage to a predetermined overvoltage threshold; and
    in response to not exceeding the predetermined overvoltage protection threshold, providing the reduced voltage and constant power to a supply contact (B+) of the multi-cell battery pack for supplying voltage and sourcing current to the portable radio device.

15. The method of claim 14, wherein the overvoltage threshold is set to a threshold level that prevents excessive voltage being presented to the supply contact of the battery pack.

16. The method of claim 14, further comprising:
    boosting, within the battery pack, a lower input voltage generated by a charger to a higher voltage for charging the cells during a charging mode.

17. The method of claim 14, further comprising:
    turning on high current peak features at the portable radio device without throttling or turning off features.

18. The method of claim 14, wherein the portable radio is a converged device wherein high peak current application features associated with LTE are run simultaneously with LMR application features.

19. A portable radio, comprising:
    a radio portion providing converged communications over land mobile radio (LMR) and broadband;
    a battery pack for powering the radio portion, the battery pack comprising:
    an internal cell stack of Li-Ion cells characterized by a linear output voltage curve with an internal cell stack voltage that is higher than an operational voltage of the portable radio; and
    a DC-DC converter applied to the an internal cell stack voltage, the DC-DC converter converting the internal cell stack voltage to a desired DC-DC converter output voltage, the internal cell stack voltage providing headroom for operation of the DC-DC converter.

20. The portable radio of claim 19, wherein the radio portion simultaneously operates high current peak application features associated with both LMR and broadband.

21. The battery pack of claim 1, wherein the DC-DC converter controls voltage regulation for the portable radio using a buck converter in the battery pack, without a regulator in the portable radio.

22. The method of claim 14, wherein the DC-DC converter controls voltage regulation for the portable radio using a buck converter in the battery pack, without a regulator in the portable radio.

23. The portable radio of claim 19, wherein the DC-DC converter controls voltage regulation for the portable radio using a buck converter in the battery pack, without a regulator in the radio portion.

24. The battery pack of claim 1, wherein the battery pack provides a single B+ output voltage providing sufficient current sourcing capability to simultaneously operate high current peak features without throttling or turning off features of the portable radio.

25. The method of claim 14, wherein the supply contact (B+) of the multi-cell battery pack is a single B+ output voltage providing sufficient current sourcing capability to simultaneously operate high current peak features without throttling or turning off features of the portable radio device.

26. The portable radio of claim 19, wherein the battery pack provides a single B+ output voltage providing sufficient current sourcing capability to simultaneously operate high current peak features without throttling or turning off features of the portable radio.

\* \* \* \* \*